(12) United States Patent
Burchfiel

(10) Patent No.: US 6,678,590 B1
(45) Date of Patent: Jan. 13, 2004

(54) VEHICLE NAVIGATION SYSTEM WITH VISION SYSTEM PREPROCESSOR USING MPEG ENCODER

(75) Inventor: Jerry D. Burchfiel, Waltham, MA (US)

(73) Assignee: BBNT Solutions LLC, Cambridge, MA (US)

( * ) Notice: Subject to any disclaimer, the term of this patent is extended or adjusted under 35 U.S.C. 154(b) by 62 days.

(21) Appl. No.: 09/915,261

(22) Filed: Jul. 25, 2001

Related U.S. Application Data

(60) Provisional application No. 60/240,885, filed on Oct. 17, 2000.

(51) Int. Cl.[7] ............................................. G01M 17/00
(52) U.S. Cl. ........................... 701/28; 701/50; 348/116; 348/138; 282/106; 282/107; 382/162; 382/163
(58) Field of Search ..................... 701/28, 50; 348/138, 348/116, 118, 119; 282/106, 107; 382/104, 106, 162, 163, 164, 165, 166, 167

(56) References Cited

U.S. PATENT DOCUMENTS

| | | | | |
|---|---|---|---|---|
| 4,695,156 A | * | 9/1987 | Taft ............................. | 356/3.14 |
| 4,695,959 A | * | 9/1987 | Lees et al. .................... | 701/225 |
| 5,552,787 A | * | 9/1996 | Schuler et al. ................. | 342/25 |
| 5,699,117 A | * | 12/1997 | Uramoto et al. .......... | 348/390.1 |
| 5,748,242 A | * | 5/1998 | Podilchuk ................. | 348/391.1 |
| 5,852,706 A | * | 12/1998 | Ogikubo et al. ............ | 386/111 |
| 5,867,221 A | * | 2/1999 | Pullen et al. ............ | 375/240.16 |
| 5,978,029 A | * | 11/1999 | Boice et al. ............ | 375/240.14 |
| 5,987,488 A | * | 11/1999 | Harrand et al. ............. | 708/520 |
| 5,990,955 A | * | 11/1999 | Koz ........................... | 349/113 |
| 6,091,770 A | * | 7/2000 | Imura ..................... | 375/240.12 |
| 6,141,434 A | * | 10/2000 | Christian et al. ........... | 382/103 |
| 6,285,930 B1 | * | 9/2001 | Dickson et al. ............... | 701/28 |

* cited by examiner

*Primary Examiner*—Marthe Y. Marc-Coleman
(74) *Attorney, Agent, or Firm*—Leonard Charles Suchyta; James K. Weixel

(57) ABSTRACT

A navigation system for an unmanned ground vehicle (UGV) includes an MPEG encoder that pre-processes frame data from a plurality of cameras on the UGV before the data is used to generate maps that identify objects in the vehicle's field of view and that identify terrain characteristics. The MPEG encoder converts the red-green-blue (RGB) data into luminance-chrominance (YUV) data. The luminance and chrominance data for each frame are divided into blocks for determining motion vectors, average chrominance values, and spatial frequencies for each block. A range map identifying objects is generated from the motion vectors and average chrominance values, and a slope map identifying terrain characteristics is generated from the spatial frequencies.

17 Claims, 3 Drawing Sheets

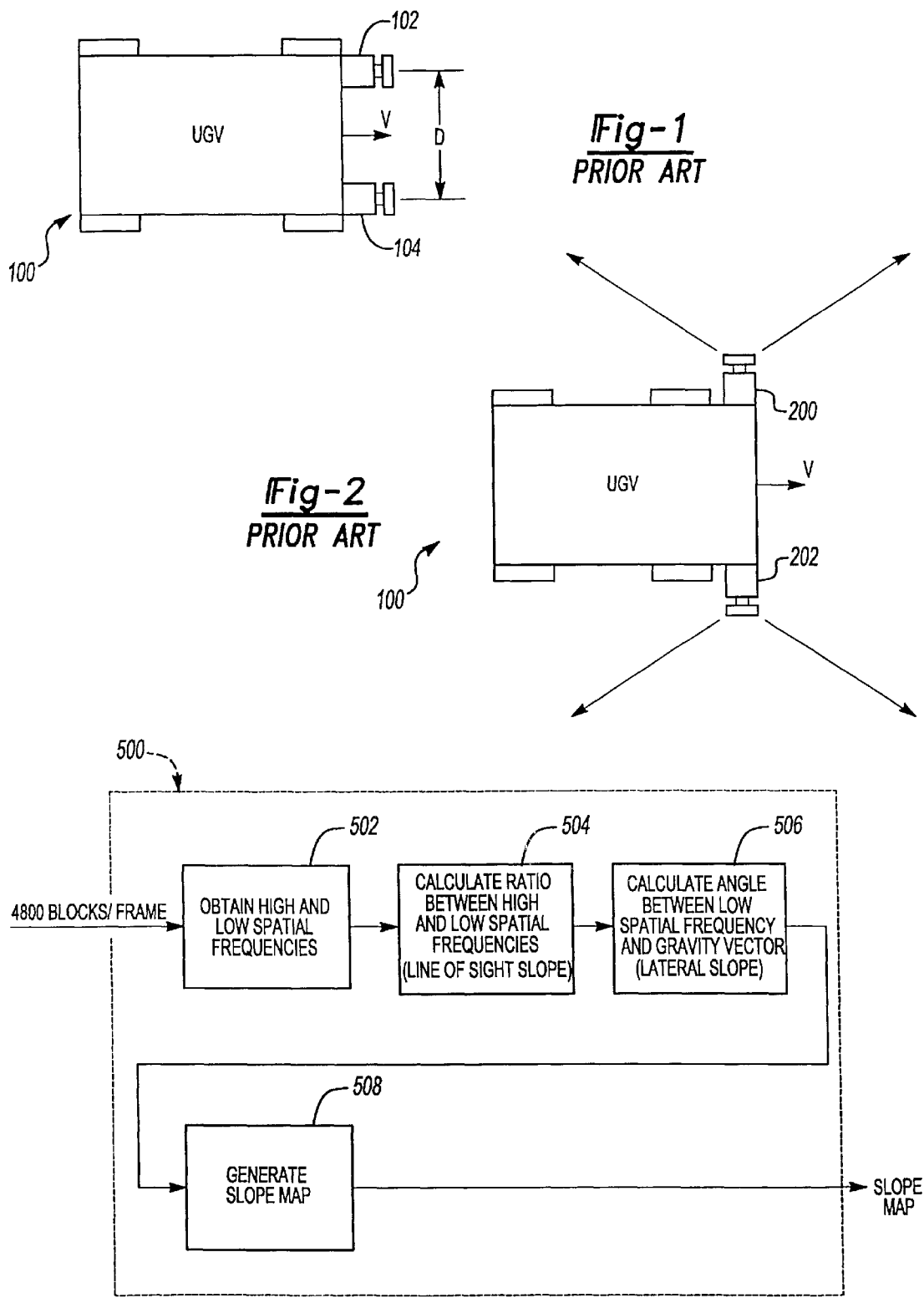

VEHICLE NAVIGATION SYSTEM WITH VISION SYSTEM PREPROCESSOR USING MPEG ENCODER

CROSS-REFERENCE TO RELATED APPLICATIONS

This application claims priority of U.S. Provisional Patent Application Ser. No. 60/240,885, entitled "COMPUTER ALGORITHMS", filed Oct. 17, 2000, which is incorporated by reference herein in its entirety.

BACKGROUND OF THE INVENTION

1. Field of the Invention

The present invention relates to navigation of an unmanned ground vehicle (UGV), and more particularly to a navigational system used by a UGV to obtain terrain information to identify objects and terrain characteristics for autonomous vehicle navigation.

2. Description of the Related Art

Unmanned ground vehicles, or UGV's, are robots that are designed to navigate across terrain without direct human involvement. To prevent the vehicle from driving over terrain that would cause the vehicle to roll over and from colliding with objects in its path, various navigational systems have been proposed to provide the vehicle with information that allows the vehicle to detect navigable routes. Previous proposals for vehicle navigational systems attempted to provide extensive vehicle mobility by incorporating complex on-road and off-road navigation tools, sensing techniques, and route planning algorithms. Currently known navigational systems often include a scanning laser that detects the presence and range of objects in the vehicle's path as well as terrain characteristics. These systems include sensors that receive the laser light as it bounces off of objects within the vehicle's field of view.

As also shown in FIG. 1, the forward-facing cameras 102, 104 each obtain image frames of a scene in front of the vehicle 100. For any given scene, the two frames (forming a forward-looking stereo pair) obtained from the two forward-facing cameras are obtained from points separated by a distance D, which is the distance between the two cameras. For an unmanned vehicle that is the size of an all-terrain vehicle, the distance D can range from ½ to 1 meter. In FIG. 2, two successive side-looking frames (forming a stereo pair looking either right or left) can be taken by the same side-facing camera 200 or 202 from successive vehicle positions separated by the vehicle's travel distance V Δt. For example, at V=15 m/s and Δt=1/30 sec, V Δt ½ meter.

As also shown in FIG. 1, the forward-facing cameras 102, 104 each obtain image frames of a scene in front of the vehicle 104. For any given scene, the two frames (forming a forward-looking stereo pair) obtained from the two forward-facing cameras are obtained from points separated by a distance D, which is the distance between the two cameras. For an unmanned vehicle that is the size of an all-terrain vehicle, the distance D can range from ½ to 1 meter. In FIG. 2, two successive side-looking frames (forming a stereo pair looking either right or left) can be taken by the same side-facing camera 200 or 202 from successive vehicle positions separated by the vehicle's travel distance V Δt. For example, at V=15 m/s and Δt=1/30 sec, V Δt=½ meter.

In both camera configurations, the distance between the vehicle 100 and any given object in the field of view, or "range", can be computed from the parallax of each object, i.e., the difference in its direction in the two frames forming the stereo pair due to separation of their viewpoints. If an object appears at angles differing by $\theta$ (in radians, assumed small) as seen by points separated by D, it is considered to be at range $R=D/\theta$. Distant objects will appear not to move (in angle) between the two image frames in a given stereo pair, while close objects will appear to move abruptly across the foreground when the two frames are compared.

From this range calculation, a navigation system (not shown) for the vehicle 100 generates a range map that maps all of the objects in the vehicle's forward and/or side field of view and indicates their range. Locating the presence of objects as well as their corresponding ranges is one key feature that makes unmanned land navigation possible because it allows the vehicle 100 to detect and avoid large objects in its path.

In addition to object range detection, the vehicle 100 must also detect the terrain characteristics, such as longitudinal and lateral slope, and determine whether they fall within the limits of the vehicle's traction capabilities. This requires the vehicle to measure the local vertical vector, or gravity vector, with respect to the camera direction to determine the slope of the terrain over which the vehicle will travel.

The problem with currently known navigational systems, however, is that the processing needed for detecting the parallax of each object and computing the range from the image frame pairs is complex and requires computers with high-speed processing capabilities. For example, each video camera may capture 300 K pixels (640 by 480 per frame) 30 times per second, where each pixel has 8 bits each of red, blue, and green color data. This results in a data flow of 220 Mb/s (27.6 MByte/s) per camera. Using a general purpose computer to accommodate this data rate and match corresponding objects in the two frames in each stereo pair is impractical at this high data rate. Expensive high-speed digital processing systems do exist, but these systems can cost tens of thousands of dollars and are not widely available. Incorporating laser scanning systems are an alternative to the video cameras, but these systems are also expensive, are not widely available, and also require specialized high-speed data processing equipment. As a result, there are currently no known practical solutions for constructing an affordable unmanned vehicle navigation system.

There is a need for a navigation system that can equip vehicles with autonomous, unmanned driving capabilities without requiring expensive, complex equipment for capturing or processing navigational data.

SUMMARY OF THE INVENTION

Accordingly, the present invention is directed to a navigation system having a pre-processor, such as an MPEG encoder, for pre-processing image data from at least one camera on an unmanned vehicle. In one embodiment, the pre-processor captures a pair of image frames and compresses the frames by converting the pixel data in the image frames from Red, Green, Blue (RGB) data into luminance and chrominance (YUV) data. A processor then uses the luminance and chrominance data to generate a range map indicating the presence and distance of objects in the vehicle's field of view and a slope map of the terrain characteristics, both of which are used to guide autonomous movement of the vehicle without human intervention. More particularly, the vehicle uses the range map and the slope map to avoid collisions with objects in its path and slopes that are too steep for the vehicle to negotiate.

In one embodiment of the inventive system, the range map is generated by segmenting each frame into macroblocks, determining a range for each macroblock from a corresponding motion vector, determining an average block color from the chrominance data, and merging adjacent blocks having the same color and range to identify objects. The slope map is generated based on the relationship between lowest and highest spatial frequencies for a given terrain texture, which is obtained from the luminance data as well as the relationship between the lowest spatial frequency, and a gravity vector.

The pre-processor in the inventive system allows commercially available, off-the-shelf processors to generate range and slope maps for unmanned vehicle navigation in real time by reducing the data rate of the image data from the camera sufficiently so that inexpensive, commonly available processors can process the image data for navigation purposes. Further, by dividing the frames into blocks and generating the range and slope maps based on these blocks rather than the individual pixels, the amount of processing required to obtain the navigation data is greatly reduced, thereby eliminating the need for expensive high-speed processors. Using image data, rather than complex lasers and laser sensors, further simplifies the manner in which navigational data is generated.

BRIEF DESCRIPTION OF THE DRAWINGS

FIG. 1 is a representative top view of an unmanned ground vehicle with a stereo pair of forward-facing cameras;

FIG. 2 is a representative top view of an unmanned ground vehicle with a pair of side-facing cameras;

FIG. 5 is a block diagram illustrating a process for generating a slope map according to the invention.

DESCRIPTION OF THE PREFERRED EMBODIMENT

Figure 3:
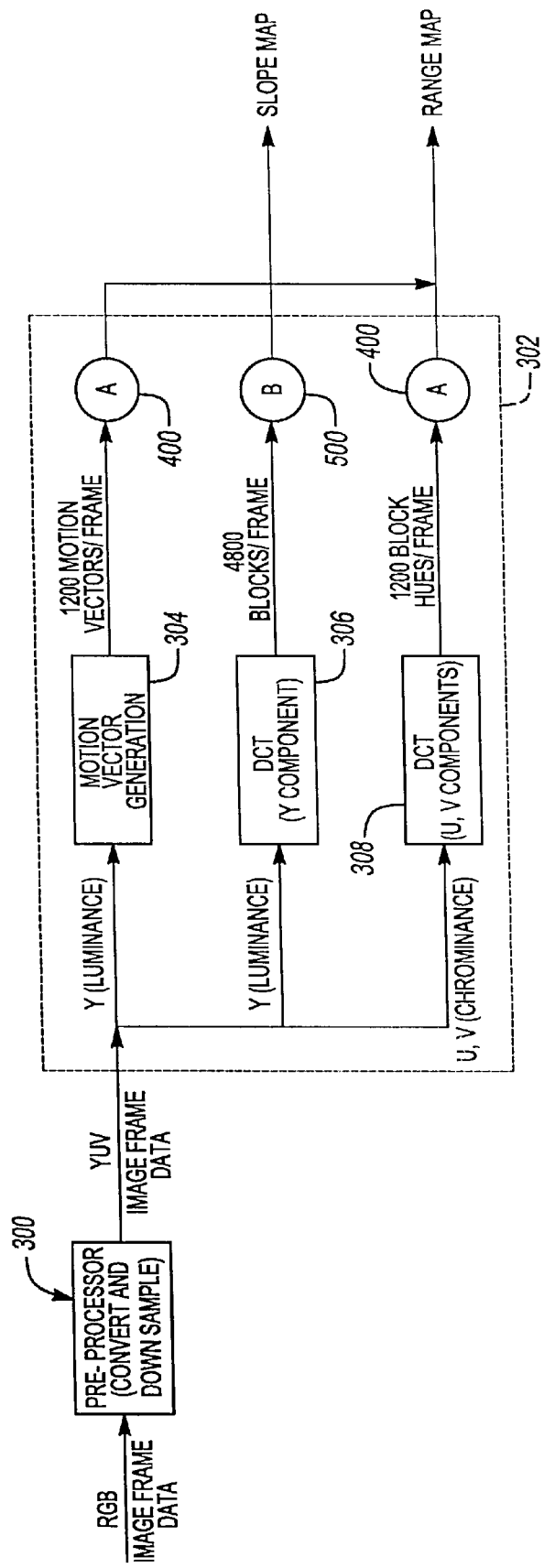
FIG. 3 is a block diagram illustrating the steps used by a pre-processor and processor in the inventive system.

FIG. 3 is a block diagram illustrating the manner in which the inventive system processes image data obtained from the cameras shown in FIGS. 1 and 2. As can be seen in the Figure, the data obtained from the cameras is input into a pre-processor 300, such as an MPEG encoder, for pre-processing of the frames in real time. The camera data is in the form of image frame data, which normally contains 640×480 pixels per frame, each pixel having 8 bits each of red, blue, and green (RGB) data. The image frame data can be obtained from cameras that are configured in the manner shown in FIGS. 1 and 2 (e.g., from a stereo pair of forward-facing cameras or from a side-facing camera sampled periodically as the vehicle changes position).

As is known in the art, MPEG, or Motion Picture Experts Group, is a set of encoding standards approved by the International Standards Organization (ISO). MPEG has several versions, MPEG-1, MPEG-2, and MPEG-4, to handle differing resolutions and interactivity. MPEG encoders are available as single application specific integrated circuit (ASIC) chips that encode MPEG-1 and MPEG-2 in real time. MPEG-1 can reduce a 220 Mb/s camera stream to about 1.2 Mb/s (a compression factor of 183), and MPEG-2 can reduce the camera stream to about 5 Mb/s (a compression factor of 44). It is this reduction in data rate by a commodity chip (or add-in PC card) that makes it practical and affordable to process the reduced stream in an inexpensive PC, deriving the range of every object in the vehicle's field of view.

Once the frame data is received by the MPEG encoder pre-processor 300, the MPEG encoder converts the RGB pixel data into a luminance component Y and two chrominance components U and V. As is known in the art, luminance component Y form the "black and white" component of the image, and chrominance components U and V form the color components Cb (blue-yellow) and Cr (red-cyan). Because the chrominance components U,V contain less resolution than the RGB pixel data, the chrominance components can be carried over less bandwidth. The chrominance components U and V are downsampled by the MPEG encoder 300 by a factor of two in each frame dimension (for a total factor of 4). This downsampling procedure reduces the amount of data that needs to be processed without causing a noticeable decrease in image quality.

Note that MPEG encoders normally use two successive frames from a single camera to perform motion compensation calculations; however, the inventive system is not limited in such a manner and can receive any two frames of interest for the calculation. For example, to analyze the field of view obtained from the forward-facing cameras, the MPEG encoder may interleave frames from the two forward-facing cameras by using, for example, a video switch for feeding frames in real time or frames captured from the two cameras and digitally stored. Similarly, frames from the side-facing cameras can also be captured and stored, with frame pairs being selectively fed to the MPEG encoder only when the vehicle has moved an adequate distance for stereopsis to occur.

Once the MPEG encoder pre-processor 300 has converted and downsampled the camera data, the MPEG encoder pre-processor 300 outputs the luminance component Y and the chrominance components U, V into a processor 302 for generating range and slope maps. The luminance components from the frame pairs are used to generate motion compensation vectors, which will be used to create a range map mapping the presence of objects in the vehicle's field of view as well as the distance between the objects and the vehicle. To do this, the luminance components for each frame are first grouped into "macroblocks" of 16×16 pixels each by the processor 302, which is indicated in FIG. 3 as a motion vector generation block 304. The luminance components of frame pairs, such as frames obtained from a stereo pair of forward-facing cameras or a pair of images obtained from a side-facing camera as the vehicle changes position, are sent from the MPEG encoder pre-processor 300 to the processor 302. The luminance values for corresponding macroblocks between the two frames are then compared over a range of x and y shifts to identify the best match between macroblocks of the two frames. This shift is the motion vector, which indicates the movement represented by changes in corresponding macroblocks between the two frames. This comparison operation can require billions of operations per second, and drives the need for specialized hardware to handle the operations. This is typically accomplished in commercial real-time MPEG encoder chips. Each frame has 1200 macroblocks (40 macroblocks×30 macroblocks); as a result, the processor will generate 1200 motion vectors, one for each macroblock.

To obtain data regarding terrain characteristics, the luminance component Y for each frame is also grouped into smaller blocks of 8×8 pixels each, creating 4800 blocks per frame. These blocks are transformed by the processor 302 using discrete cosine transformation (DCT) into two-dimensional spatial frequency components and is indicated in FIG. 3 as a first DCT block 306. More particularly, each 8×8 block of pixels in the luminance channel, after undergoing discrete cosine transformation, expresses the luminance component Y in two-dimensional spatial frequencies ranging over a set of 8×8 frequency "bins", each bin corresponding to a two-dimensional spatial frequency in the corresponding block, resulting in 64 spatial frequencies per block. The frequency components indicate the texture of the terrain and will be explained in greater detail below.

The chrominance components U, V are also grouped into blocks of 8×8 pixels by the processor 302 after they have been downsampled by the MPEG encoder. This specific function is shown in FIG. 3 as a second DCT block 308. Because the chrominance components U, V have been downsampled by a factor of 4 before grouping, the grouping results in 1200 blocks that match the 1200 macroblocks used to generate the 1200 motion vectors from the luminance components. After the 1200 chrominance data macroblocks have been transformed via discrete cosine transformation in block 308 of the processor 302, each macroblock will include an average chrominance value of the 64 pixels in the block. As a result, each frame will have 1200 luminance data macroblocks, and therefore 1200 motion vectors, as well as 1200 chrominance data macroblocks.

Figure 4:
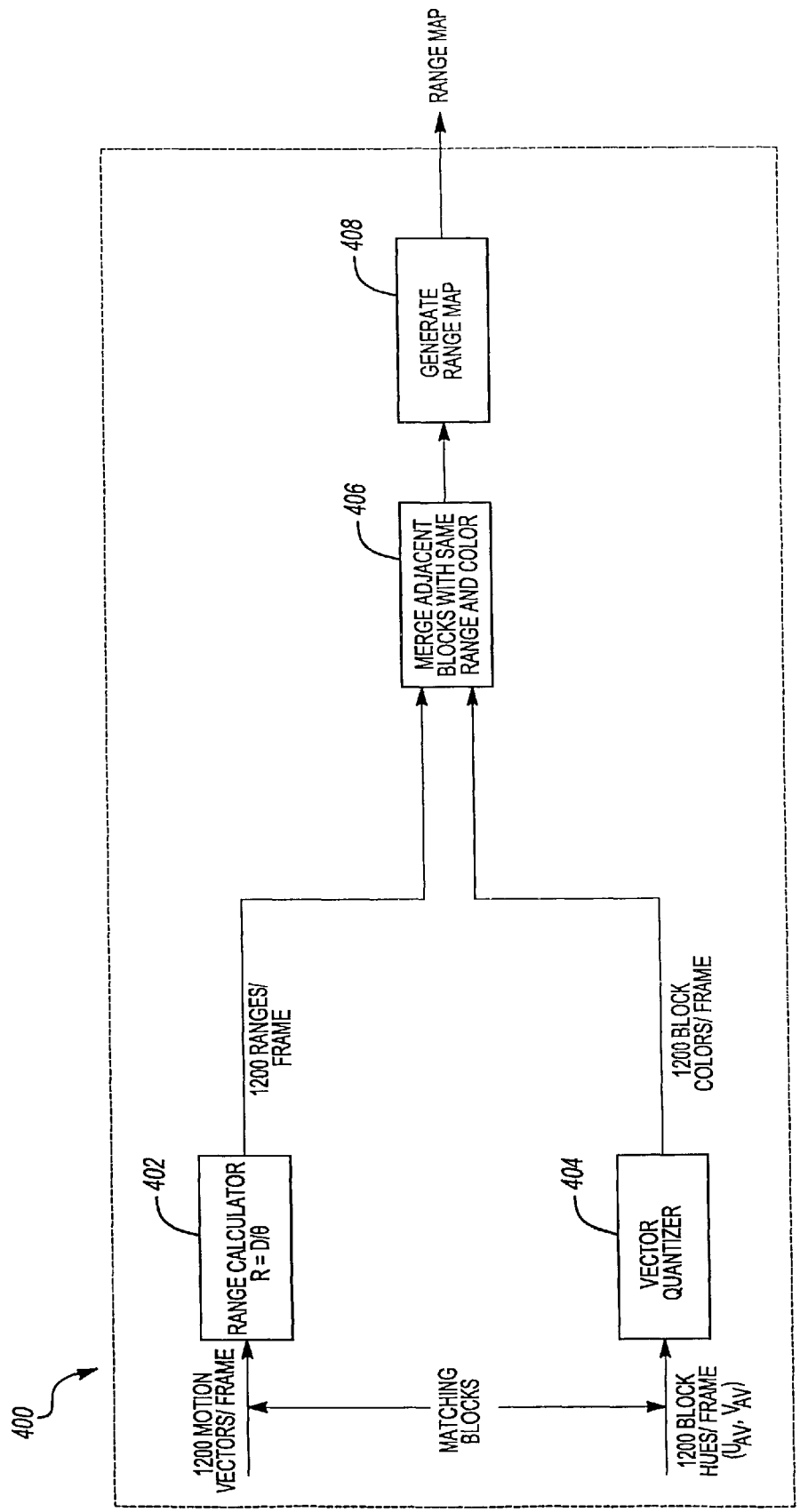
FIG. 4 is a block diagram illustrating a process for generating a range map according to the invention.

FIG. 4 is a block diagram of a first sub-processor 400 illustrating the manner in which the processor 302 generates a range map from the motion vectors from the motion vector block 304 and the average chrominance values from the 1200 blocks generated by the second DCT block 308 via object segmentation. By way of background, chrominance data and motion vectors are used by the inventive system to generate the range map instead of the luminance data because of the manner in which the luminance and chrominance data reflect the presence of objects and object textures. Generally, textures in objects, particularly natural objects, appear in an image primarily due to different levels of illumination and shadow on the object. These variations are particularly pronounced when portions of the object shade other portions of the object, or when a given light source illuminates different portions of the object at different angles. As a result, any texture variations will appear in the luminance component Y of the image frame data and not in the chrominance components U and V.

When the chrominance components of an image are viewed alone, without the luminance component, objects will appear smooth and with little detail. This smoothness allows easy identification of objects by eliminating variations in the frame due to illumination differences, textures, and shadows, allowing frame segmentation based on color differences alone. More particularly, blocks having the same color value (generated from the chrominance data) and range are considered by the system to be portions of the same object.

Referring back to FIGS. 3 and 4, once the MPEG encoder pre-processor 300 and the processor 302 have reduced the chrominance data of the 330K pixels/frame into 1200 macroblocks, each macroblock will have a motion vector (generated from the luminance data) and average chrominance values Uav, Vav associated with it, as noted above. The motion vector for each macroblock is used by a range calculator 402 in the processor 302 to generate a corresponding range for that macroblock using the stereopsis principles explained above, where the range R=D/θ,θ being the angle in radians in which a given object appears different as seen by points separated by distance D. The average chrominance values Uav, Vav are sent to a vector quantizer 404 to generate an average block color for each macroblock. The range and the average block color for each block is then used to segment the frame by grouping adjacent blocks having the same range and same color into image segments as indicated in block 406. The image segments formed from the grouped blocks are interpreted as objects in the vehicle's field of view. Because the MPEG encoder has reduced the number of data records to be processed by a factor of 275 or more, the segmentation process at block 406 can be easily conducted by commonly available processors instead of expensive, specialized high-speed processors.

After the frame has been segmented, sub-processor 400 within processor 302 generates the range map at block 408 from the frame segments, which indicates the objects and their corresponding ranges in the vehicle's field of view. From this range map, the vehicle can locate objects and avoid collisions by noting the presence of objects as well as their distances from the vehicle.

FIG. 5 is a block diagram of a second sub-processor 500 illustrating the manner in which the processor 302, 500 generates a slope map that indicates the terrain characteristics, such as the terrain's longitudinal and lateral slopes. This slope information ensures that the vehicle's traction mechanism can negotiate the terrain without tipping. The 4800 two-dimensional spatial frequencies obtained from the luminance components Y of the 4800 blocks per frame, as described above with respect to FIG. 3, can be used to generate the slope map.

The process for generating the slope map, as illustrated in FIG. 5, assumes that the terrain (e.g., grass, dirt) has a relatively uniform texture and therefore uniform spatial frequencies in each of the surface's two dimensions. To determine the angle of the terrain with respect to the vehicle's line of sight, the frequencies are projected on the frame axes such that the lowest spatial frequency for the primary component of the texture frequency extends along one axis and the highest spatial frequency extends at right angles to it along the other axis. This is shown in the Figure as block 502.

The ratio of the highest and the lowest spatial frequencies as calculated at block 504 gives the cosine of the angle between the terrain's surface normal and the vehicle's line of sight. For example, if the vehicle views a surface along its surface normal, the ratio would be one, and the angle between the surface normal and the vehicle's line of sight would be zero degrees. The ratio between the highest and lowest spatial frequencies provides a direct measurement of the terrain surface angle relative to the vehicle's line of sight.

In addition, the angle between the lowest spatial frequency and a gravity vector, which indicates the direction of gravity, indicates the lateral slope of the terrain at a given location. If the gravity vector and the lowest spatial frequency form a right angle, for example, this indicates that the ground is horizontal and flat. Thus, the transformed luminance component Y can be used to determine the lateral terrain slope as well as the angle between a normal of the terrain and the vehicle's line of sight, thereby allowing terrain navigation from a distance. The processor 302 uses these calculated angles to generate a slope map 508 for navigating the vehicle.

The manner in which the range map and the slope map is used by the vehicle to navigate itself will now be explained. Referring first to the range map, the frame segmentation using the chrominance data U, V may result in a range map that shows a single potential object having a large range variation, as indicated by the motion vectors of the component macroblocks in the segmented frame. If the range of the object varies smoothly from one part of the object to another, the vehicle interprets this information to indicate the presence of an object that extends a significant distance in the depth direction, that is, in the direction of the vehicle's line of sight. This smooth variation indicates desirable navigation paths by noting the location of navigable terrain, road, or paths as well as the location of a treeline or vertical cliff (indicating the outer boundary of free navigation).

The range map can be evaluated in conjunction with the texture frequency, and the spatial frequency of the primary component in particular, because the primary component increases linearly with the distance from the vehicle's viewpoint. If a given object shows a smooth increase in primary frequency corresponding to a smooth increase in range, the object is considered one with extended depth and therefore an object that can either support navigation (if the object is horizontal) or restrict navigation (if the object is vertical).

Alternatively, the range map may indicate a discontinuous jump in the range from a relatively low value to a larger value within the same object. If this discontinuity occurs when the frame is viewed in a vertical scan starting at the bottom of the frame, parallel to the local gravity vector, this may indicate that it is approaching a cliff. The vehicle may use this information by approaching the location exhibiting the range discontinuity slowly to see whether the discontinuity changes into a continuous gradual increase (indicating the back side of a hill) or a sharp increase (indicating a cliff).

In addition to scanning the frame vertically from bottom to top, parallel to the local gravity vector, the navigation system should also scan horizontally across the frame from right to left, at right angles to the local gravity vector. During this horizontal scan, the range map may indicate that the range for certain objects first increases, then decreases. This type of range map pattern corresponds to a path between objects that are relatively close to the vehicle on the right and left sides, forming a corridor. After identifying this pattern, the vehicle can use this navigation information to move through the corridor. Similarly, scanning from bottom to top of the frame, parallel to the local gravity vector, may show a pattern of increasing range, indicating a path that the vehicle can negotiate without colliding with an object. If the range begins to decrease as the scan is continued upward, this range pattern corresponds to an overhead obstacle, and the vehicle must calculate the available clearance before proceeding underneath.

Thus, identifying and analyzing simple range patterns, such as those described above, using the inventive navigational system provides the capability for an unmanned ground vehicle to plot its own collision and rollover avoidance maneuvers as it moves toward its desired location.

In short, using a pre-processor such as an MPEG encoder, reduces the total amount of data that needs to be processed by converting the RGB data to YUV data and then dividing the frames for each component into blocks and macroblocks. The motion compensation vectors calculated by the processor for each macroblock of pixels can be used to derive distance directly, and averaged chrominance components (U and V) can be used to classify each macroblock's average color. The combination of these two measurements will segment the frame into objects of different colors at different ranges. The DCT-transformed luminance (Y) blocks can be used to calculate the slope of the terrain for navigability, and use of the objects at different ranges can be used to derive a collision and rollover avoidance path for navigation.

Commercial off-the-shelf video compression chips (e.g., MPEG or H.261/263) can be used as the pre-processor to reduce the data rate and computation needed for autonomous UGV visual perception and terrain navigation. Compressing the image frame data makes terrain calculations feasible in an inexpensive, easily available computer instead of relying on specialized high-speed processing equipment, making autonomous terrain navigation practical and affordable for the first time. As a result, the inventive system achieves an affordable tactical land mobile unmanned ground vehicle having a size and speed comparable to an all terrain vehicle While the invention has been specifically described in connection with certain specific embodiments thereof, it is to be understood that this is by way of illustration and not of limitation, and the scope of the appended claims should be construed as broadly as the prior art will permit.

What is claimed is:

1. A vehicle navigation system, comprising:
   at least one sensor for capturing image frames, each image frame containing pixel color data;
   a pre-processor coupled to said at least one camera for receiving image frames, wherein the pre-processor converts the pixel color data into luminance and chrominance data; and
   a processor that processes the luminance and chrominance data to identify at least one of an object and a terrain characteristic, wherein the processor transforms the luminance data into frequency components, and wherein the frequency components from the luminance component are two-dimensional frequency components having a high spatial frequency and a low spatial frequency, and wherein the processor calculates the ratio between the high and low spatial frequencies to determine a slope of the terrain relative to the vehicle's line of sight.

2. The navigation system of claim 1, wherein the processor further calculates the angle between the low spatial frequency and a gravity vector to determine a lateral slope of the terrain.

3. A vehicle navigation system, comprising:
   at least one sensor for capturing image frames, each image frame containing pixel color data;
   a pre-processor coupled to said at least one camera for receiving image frames, wherein the pre-processor converts the pixel color data into luminance and chrominance data; and
   a processor that processes the luminance and chrominance data to identify at least one of an object and a terrain characteristic, wherein the processor generates a plurality of macroblocks for each image frame and transforms the chrominance data of each macroblock to obtain an average chrominance value, generates a motion vector of each macroblock from the luminance data, and wherein the processor includes:
   a range calculator that identifies the range corresponding to each macro-block from the motion vector;
   a quantizer that quantizes the chrominance value for each macro-block to obtain an average block color; and
   a segmenter that segments the frame by merging adjacent macro-blocks having substantially the same range and substantially the same block color to identify the object.

4. A vehicle navigation system, comprising:
   a plurality of sensors for capturing image frames, each image frame containing pixel color data;

a pre-processor coupled to said plurality of sensors for receiving said image frames, wherein the pre-processor converts the pixel color data into luminance and chrominance data; and a processor that processes the luminance and chrominance data to generate at least one of a range map that identifies an object and object range and a slope map that identifies a terrain characteristic, wherein the processor transforms the luminance and chrominance data and generates motion vectors and image segments for generating said range map and slope map.

5. The navigation system of claim 4, wherein the pre-processor is a video encoder.

6. The navigation system of claim 5, wherein the video encoder is one selected from the group consisting of an H.261/263 encoder and an MPEG encoder.

7. The navigation system of claim 4, wherein the processor transforms the luminance and chrominance data using discrete cosine transformation.

8. The navigation system of claim 4, wherein the processor obtains terrain characteristics by dividing the luminance data into blocks and obtaining two-dimensional frequency components having a high spatial frequency and a low spatial frequency for each block via the transformation of the luminance data, and wherein the processor calculates the ratio between the high and low spatial frequencies to determine the slope of the terrain relative to the vehicle's line of sight and calculates the angle between the low spatial frequency and a gravity vector to determine the lateral slope of the terrain.

9. The navigation system of claim 8, wherein the processor further identifies at least one of an object and object distance by dividing each image frame into a plurality of macroblocks and deriving a motion vector for each macroblock from the luminance data.

10. The navigation system of claim 9, wherein the processor generates the motion vector for each macroblock by comparing a macroblock of a first image frame with a shifted macroblock of a second image frame and identifying a shift that corresponds to a match between the first and second image frames.

11. The navigation system of claim 9, wherein the processor includes:

a range calculator that identifies the range corresponding to each macroblock from the motion vector;

a quantizer that quantizes the chrominance value for each macroblock to obtain an average block color; and a segmenter that segments the frame by merging adjacent macroblocks having substantially the same range and substantially the same block color to identify the object.

12. A method for navigating a vehicle, comprising the steps of:

obtaining a first image frame and a second image frame, wherein the image frames contain pixel color data;

converting the pixel color data into luminance data and chrominance data;

detecting at least one of an object and object range using the chrominance data; and detecting a terrain characteristic using the luminance data;

creating a range map of the object identified in the object detecting step; and creating a slope map from the terrain characteristics identified in the terrain characteristic detecting step, wherein the range map and the slope map are used to navigate the vehicle.

13. The method of claim 12, wherein the step of creating a range map includes the steps of:

dividing each frame into a plurality of macroblocks;

deriving a motion vector for each macroblock from the luminance value, the motion vector indicating a range;

obtaining an average block color for each macroblock; and merging adjacent macroblocks having substantially the same average block color and substantially the same range to generate the range map identifying the presence and range of objects.

14. The method of claim 13, wherein the step of obtaining the average block color includes the step of transforming the chrominance data to obtain an average chrominance value used to generate the average block color.

15. The method of claim 14, wherein the transforming step is conducted via discrete cosine transformation.

16. The method of claim 12, wherein the step of creating a slope map includes the steps of:

dividing the luminance data for each frame into blocks;

transforming the luminance data to obtain two-dimensional frequency components having a high spatial frequency and a low spatial frequency for each block;

calculating a ratio between the high and low spatial frequencies to determine a slope of the terrain relative to the vehicle's line of sight; and calculating an angle between the low spatial frequency and a gravity vector to determine a lateral slope of the terrain.

17. The method of claim 16, wherein the transforming step is conducted via discrete cosine transformation.

* * * * *